US011980969B2

(12) United States Patent
El-Wardany et al.

(10) Patent No.: US 11,980,969 B2
(45) Date of Patent: May 14, 2024

(54) METAL ADDITIVE MANUFACTURING METHOD AND ARTICLE

(71) Applicant: RTX Corporation, Farmington, CT (US)

(72) Inventors: Tahany Ibrahim El-Wardany, Vernon, CT (US); Matthew Grow, Glastonbury, CT (US); Michael A. Klecka, Coventry, CT (US); Gregory W. Levan, Avon, CT (US); Daniel K. Seabourn, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 287 days.

(21) Appl. No.: 16/849,004

(22) Filed: Apr. 15, 2020

(65) Prior Publication Data

US 2020/0331099 A1    Oct. 22, 2020

Related U.S. Application Data

(60) Provisional application No. 62/835,818, filed on Apr. 18, 2019.

(51) Int. Cl.
| | |
|---|---|
| *B23K 26/342* | (2014.01) |
| *B22F 10/25* | (2021.01) |
| *B22F 10/36* | (2021.01) |
| *B22F 10/64* | (2021.01) |
| *B33Y 10/00* | (2015.01) |

(Continued)

(52) U.S. Cl.
CPC ............ *B23K 26/342* (2015.10); *B22F 10/25* (2021.01); *B33Y 10/00* (2014.12); *B33Y 40/00* (2014.12); *B33Y 80/00* (2014.12); *B22F 10/36* (2021.01); *B22F 10/64* (2021.01); *B22F 2998/10* (2013.01)

(58) Field of Classification Search
CPC .. B22F 3/18; B22F 10/25; B22F 10/36; B22F 10/64; B22F 2998/10; B23K 26/342
See application file for complete search history.

(56) References Cited

U.S. PATENT DOCUMENTS

| | | | | |
|---|---|---|---|---|
| 10,682,725 | B2 * | 6/2020 | Ghabchi | B23K 26/144 |
| 2013/0197683 | A1 * | 8/2013 | Zhang | B23K 35/3066 |
| | | | | 700/96 |

(Continued)

FOREIGN PATENT DOCUMENTS

EP    2962788 A1    1/2016

OTHER PUBLICATIONS

Donoghue, J., Antonysamy, A. A., Martina, F., Colegrove, P. A., Williams, S. W., & Prangnell, P. B. (2016). The effectiveness of combining rolling deformation with Wire-Arc Additive Manufacture on β-grain refinement and texture modification in Ti—6Al—4V. Materials Characterization, 114, 103-114. (Year: 2016).*

(Continued)

*Primary Examiner* — Jacob J Cigna
(74) *Attorney, Agent, or Firm* — CANTOR COLBURN LLP

(57) ABSTRACT

Disclosed herein is a method for making a metal article including repetitively depositing a layer of metal and cold working each metal layer to form the metal article. The method can be used to make a new article or repair an existing article. The metal article includes a customized local grain structure orientation which can vary by region based on design requirements.

17 Claims, 5 Drawing Sheets

(51) Int. Cl.
*B33Y 40/00* (2020.01)
*B33Y 80/00* (2015.01)

(56) References Cited

U.S. PATENT DOCUMENTS

| | | |
|---|---|---|
| 2014/0255198 A1 | 9/2014 | El-Wardany et al. |
| 2015/0360289 A1* | 12/2015 | Liou ................. B23P 15/00 164/80 |
| 2017/0129180 A1 | 5/2017 | Coates et al. |
| 2017/0326681 A1 | 11/2017 | Sidhu et al. |
| 2019/0128144 A1* | 5/2019 | Vargas .................. C22F 1/10 |

OTHER PUBLICATIONS

European Search Report for European Application No. 20170121.6; Application Filing Date: Apr. 17, 2020; dated Jul. 7, 2020, 7 pages.
Yan et al. Grain Structure Control of Additively Manufactured Metallic Materials, published Nov. 2, 2017, 11 pages.
Popovich et al., "Impact of heat treatment on mechanical behaviour of Inconel 718 processed with tailored microstructure by selective laser melting (Abstract)", Materials & Design, 2017, pp. 1-4.

* cited by examiner

METAL ADDITIVE MANUFACTURING METHOD AND ARTICLE

CROSS REFERENCE TO RELATED APPLICATIONS

This application claims the benefit of U.S. Provisional Patent Application No. 62/835,818 filed on Apr. 18, 2019 which is incorporated by reference herein in its entirety.

BACKGROUND

Exemplary embodiments of the present disclosure pertain to the art of metal additive manufacturing.

Additive manufacturing was originally developed for rapid prototyping. Additive manufacturing has since evolved to a manufacturing process capable of producing articles having complex design.

Despite advances in additive manufacturing there is additional progress to be made.

BRIEF DESCRIPTION

Disclosed is a method for making a metal article including repetitively depositing a layer of metal by additive manufacturing and cold working each metal layer to form the metal article.

In addition to one or more of the features described above, or as an alternative to any of the foregoing embodiments, the additive manufacturing method includes a melt pool or melted metal layer.

In addition to one or more of the features described above, or as an alternative to any of the foregoing embodiments, the additive manufacturing method includes directed energy deposition.

In addition to one or more of the features described above, or as an alternative to any of the foregoing embodiments, the additive manufacturing parameters are manipulated to control average grain size.

In addition to one or more of the features described above, or as an alternative to any of the foregoing embodiments, the metal layer comprises nickel, cobalt, copper, titanium, aluminum, iron, alloys including one or more of the foregoing metals, and combinations thereof.

In addition to one or more of the features described above, or as an alternative to any of the foregoing embodiments, the cold working directionally applies energy in the form of compressive strain.

In addition to one or more of the features described above, or as an alternative to any of the foregoing embodiments, cold working includes deep rolling, deep rolling with an ultrasonic head, high frequency electromagnetic hammer, pneumatic roller vibrator, and combinations thereof.

Also disclosed is a method for repairing a metal article including repetitively depositing a layer of metal by additive manufacturing and cold working each deposited layer, wherein the depositing and directional cold working occurs over a damaged section of the metal article to form a repaired section.

In addition to one or more of the features described above, or as an alternative to any of the foregoing embodiments, the additive manufacturing method includes a melt pool or melted metal layer.

In addition to one or more of the features described above, or as an alternative to any of the foregoing embodiments, the metal layer includes nickel, cobalt, copper, titanium, aluminum, iron, alloys including one or more of the foregoing metals, and combinations thereof.

In addition to one or more of the features described above, or as an alternative to any of the foregoing embodiments, the additive manufacturing parameters are manipulated to control average grain size.

In addition to one or more of the features described above, or as an alternative to any of the foregoing embodiments, cold working directionally applies energy in the form of compressive strain.

In addition to one or more of the features described above, or as an alternative to any of the foregoing embodiments, cold working includes deep rolling, deep rolling with an ultrasonic head, and high frequency electromagnetic hammer, pneumatic roller vibrator, and combinations thereof.

Also disclosed is a metal article including customized local average grain size and grain crystallographic orientation.

In addition to one or more of the features described above, or as an alternative to any of the foregoing embodiments, the local grain crystallographic orientation varies by region within the article based on design requirements.

In addition to one or more of the features described above, or as an alternative to any of the foregoing embodiments, the article includes nickel, cobalt, titanium, aluminum, iron, alloys including one or more of the foregoing metals, and combinations thereof.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
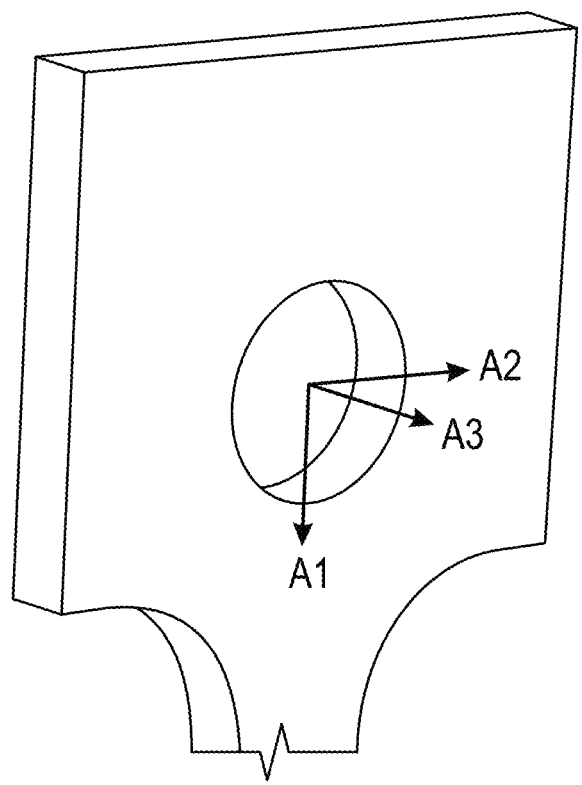
FIG. 1 is picture of a tensile strength sample.

A detailed description of one or more embodiments of the disclosed apparatus and method are presented herein by way of exemplification and not limitation with reference to the Figures.

Additive manufacturing has resulted in metal parts with decreased weight, added functionality and new design possibilities. Additional advances are sought. For example, it would be desirable to tailor physical properties affected by grain size and orientation such as yield stress, tensile strength and modulus by region within a single article. Thus the article could have first tensile yield strength in a first region and a second tensile yield strength in a second region without changing the composition of the material. Stated another way, the composition of the alloy could remain consistent throughout the article but the physical properties would vary based on location.

Disclosed herein is an additive manufacturing method which can result in an article having locally different physical properties due to the ability to tailor the grain size and grain crystallographic orientation on a layer by layer basis. The method includes forming the article layer by layer by depositing a layer of metal and cold working each deposited layer. As is known in the art of additive manufacturing the shape of the desired article is sectioned and the form of these sections determines the deposition of the metal layers. The deposition of the metal layer adds stepwise to the layer below, ultimately forming the article overall.

The metal layer may be deposited as a powder and then consolidated or the deposition and consolidation may be combined. Metal wire may be used in place of metal powder depending on the method used to form the metal layer. Any metal additive manufacturing method that involves a melt pool or melted metal layer can be used. Exemplary methods include directed energy deposition and wire arc additive manufacturing.

The deposition method parameters may be selected to yield the desired average grain size. In some embodiments the average grain size is varied by location. In some embodiments the average grain size is consistent throughout. The thickness of the deposited layer can vary depending on the deposition method and desired average grain size. In some embodiments the deposited thickness (prior to cold working) may be 60 microns to several millimeters (mm). In some embodiments the deposited layer thickness is 0.25 to 0.75 mm.

When directed energy deposition is used the laser power, toolpath speed and layer thickness can be selected to yield the desired average grain size. In general lower laser power and slower toolpath speed results in smaller average grain size and higher laser power and faster toolpath speed results in a larger average grain size. When directed energy deposition was used to deposit Waspaloy a laser power of 250-400 Watts (W) and a toolpath speed of 25 inches/minute produced an average grain size less than 100 microns. A laser power of 700-1100 W and a toolpath speed of 11 inches/minute produced an average grain size greater than 1 millimeter. Similarly, when wire arc additive manufacturing is used the deposition parameters are chosen to yield the desired average grain size. For example the laser power, wire diameter, toolpath speed and layer thickness can be selected to yield the desired grain size.

Exemplary metals include nickel, cobalt, copper, titanium, aluminum, iron, alloys including one or more of the foregoing metals, and combinations thereof. Exemplary alloys include Iconel 718, Iconel 625, stainless steel, Waspaloy and IN100. When a powder is used the metal powder particle size and particle size distribution can be determined by one of skill in the art. Similarly, when a wire is used, the size of the wire can be determined by one of skill in the art.

Each deposited metal layer is subjected to cold working prior to the deposition of another layer of metal. Exemplary cold working methods include deep rolling, deep rolling with an ultrasonic head, and high frequency electromagnetic hammer, pneumatic roller vibrator, and combinations thereof. Deep rolling of more than one deposited layer failed to produce the desired result. Without being bound by theory it is believed that the cold working method directionally applies energy in the form of compressive strain which results in a grain crystallographic orientation. The parameters of the cold working method may be chosen to produce the desired amount and type of grain crystallographic orientation.

The cold working force can be varied depending on the composition and thickness of the deposited layer. For example, deep rolling Waspaloy having a layer thickness of 0.3 to 0.7 mm may use a force of 4,000 to 25,000 Newtons (N).

Because cold working can be applied in a number of directions and the layers of the metal can be deposited to any portion of the article and the average grain size of the metal can be customized there is a nearly infinite design space for the creation of an article having regionally tailored properties. For example, a curved section of an article can be provided with a different grain size and orientation than a straight section. It is also contemplated that the grain crystallographic orientation may be layered to improve properties such as tensile strength in all directions.

After the cold working the article may be subjected to an optional heat treatment. The parameters of the heat treatment may vary to achieve crystallographic texture according to the required properties and applications.

As mentioned above, when directed energy deposition is employed the laser power and toolpath speed can affect the grain size of the consolidated metal. Lower power and faster toolpath speed has been observed to create a finer grain structure in some materials such as the nickel alloy Waspaloy. Higher power and slower toolpath speed resulted in a coarser grain structure. Generally, a finer grain structure is desired as the material has higher tensile strength than a material with a coarser grain structure. Unexpectedly it was found that a coarser grain structure in combination with cold working resulted in a material with a directional grain structure and superior physical properties such as tensile strength. The tensile yield strength showed a 25% increase over wrought Waspaloy and the tensile strength showed 20% increase over the wrought Waspaloy, while the modulus was the same as wrought Waspaloy.

Examples were made using directed energy deposition of Waspaloy followed by deep rolling. Each deposited layer had a thickness of 0.4 to 0.6 mm and was deposited using a laser power of 11,000 W and a toolpath speed of 11 inches per minute. Each layer was deep rolled with a force of 7000 N. The material had an average grain size greater than 1 mm. After heat treating the material was tested for tensile yield strength. After tensile yield strength testing the grip section (not subjected to tensile yield strength testing) and the gage section (subjected to tensile yield strength testing) were analyzed by electron backscatter diffraction (EBSD).

Figure 2A:
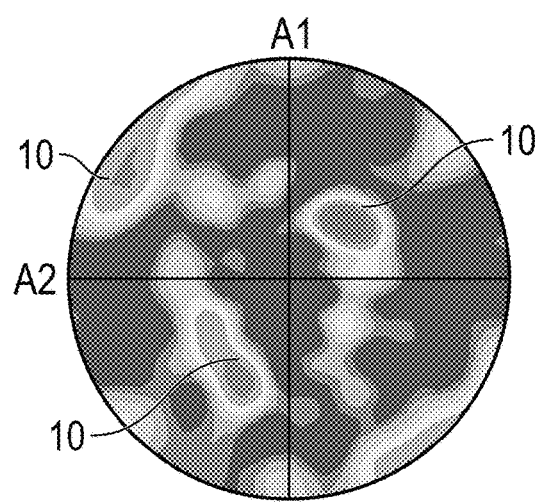
FIGS. 2A-C and 3 are inverse pole figures.
Figure 2B:
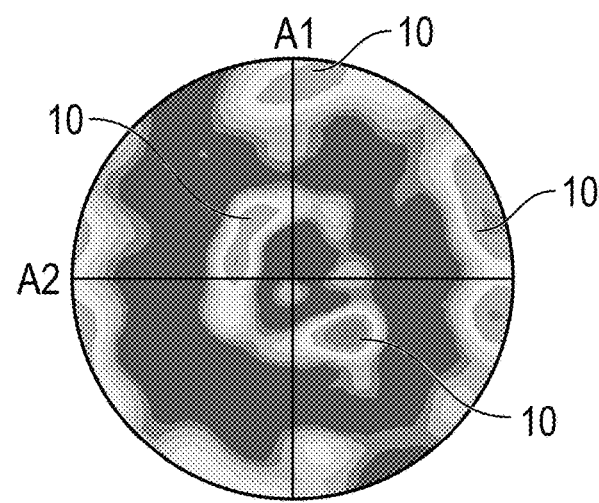
Figure 2C:
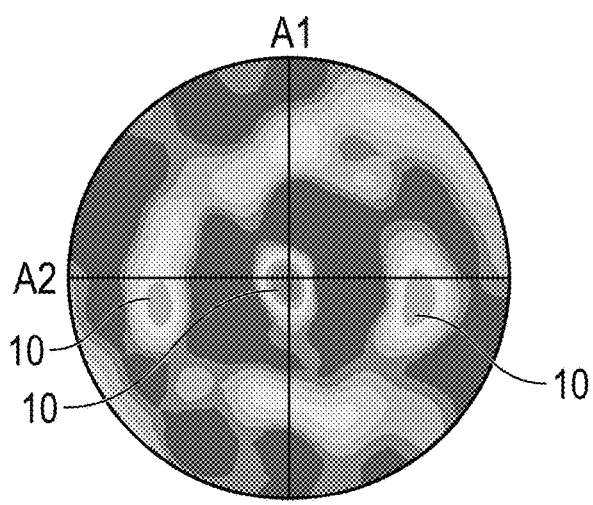
Figure 4:
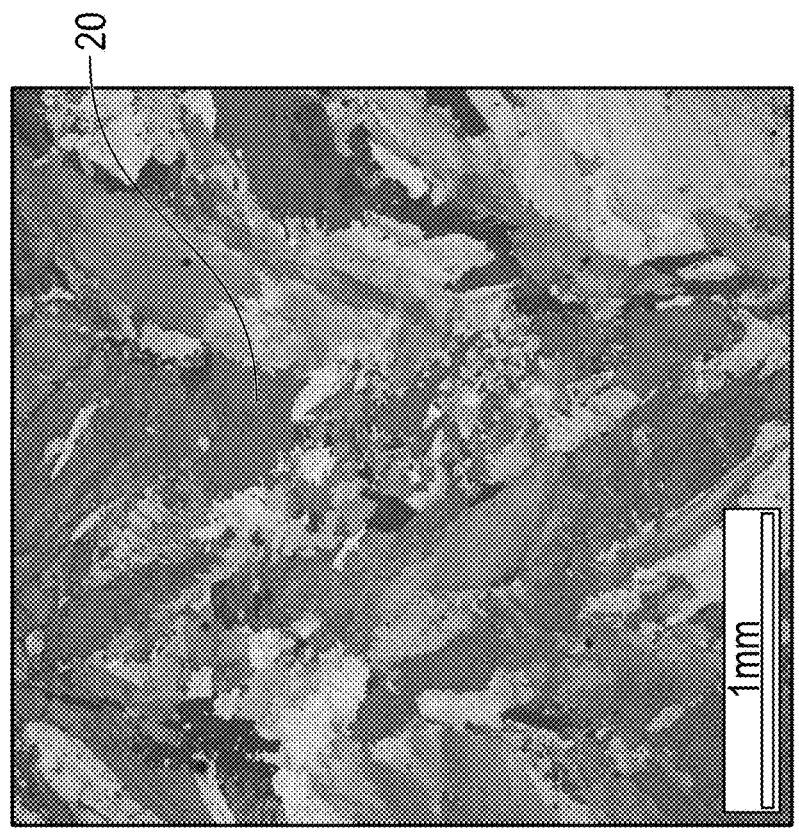
FIG. 4 is a Taylor Factor map.
Figure 3:
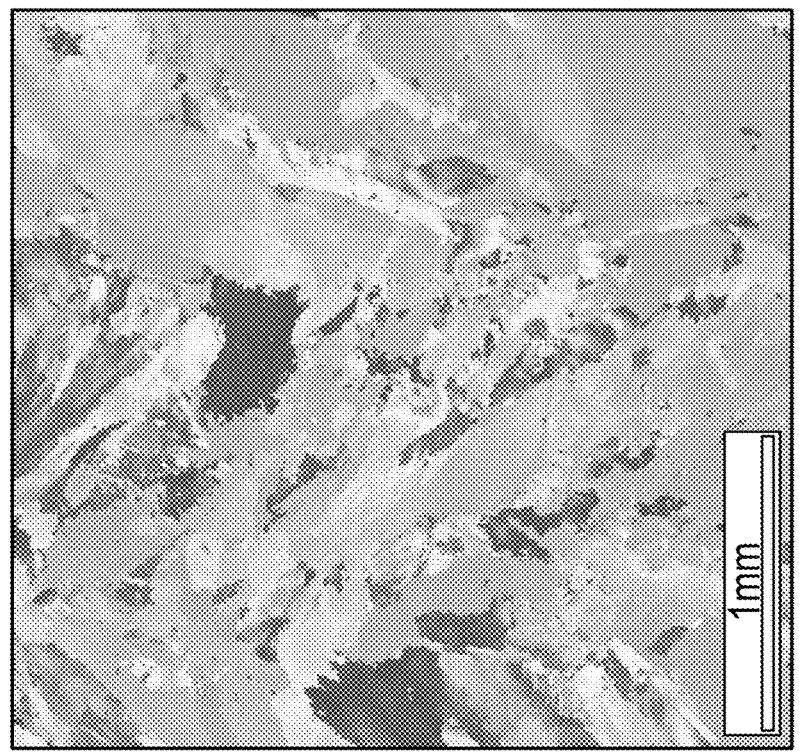

FIG. 1 shows the orientation of the axis of the tensile strength sample. Deep rolling occurred along the A2 axis. FIGS. 2A-C are inverse pole figures of the grip section of the tensile strength sample. FIG. 2A corresponds to crystallographic orientation 001, FIG. 2B corresponds to 111 and FIG. 2C corresponds to 110. The presence of significant areas of similarly oriented grains (indicated by orange and red areas and labeled 10) indicated a non-random grain crystallographic orientation. In a random grain crystallographic orientation the pattern would be diffuse without the concentrations of red and orange seen in FIGS. 2A-C. FIG. 3 is another inverse pole figure of the grip section which shows the large grain size of the sample. FIG. 4 is a Taylor Factor map. The presence of large areas (20) having a high Taylor Factor (shown in red) indicates the material is resistant to deformation under uniaxial tension.

Figure 5A:
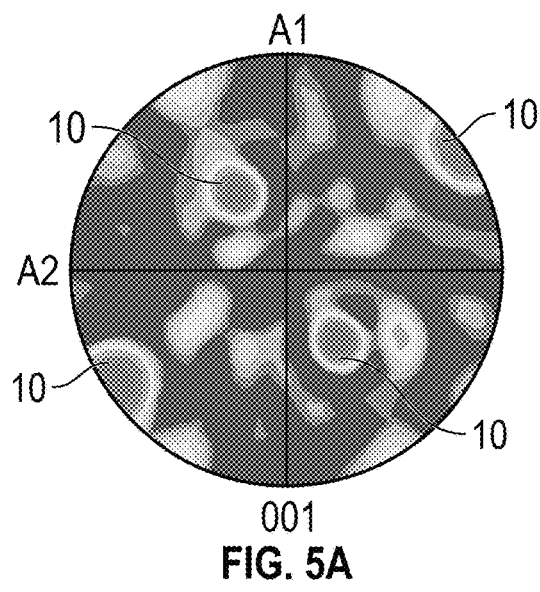
FIGS. 5A-C and 6 are inverse pole figures.
Figure 5B:
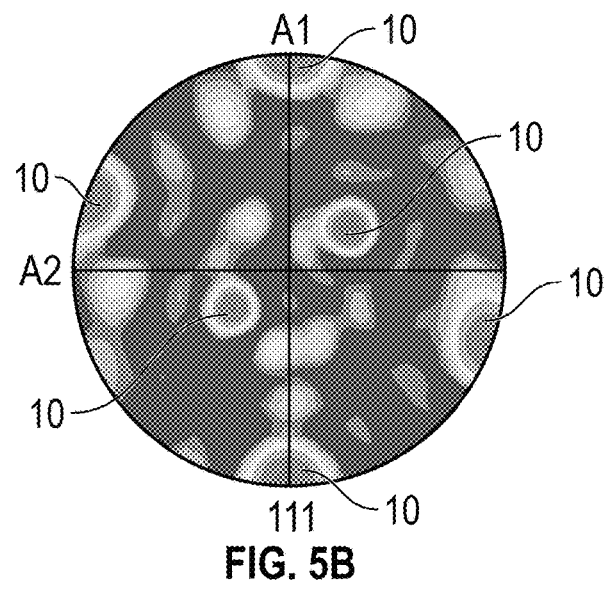
Figure 5C:
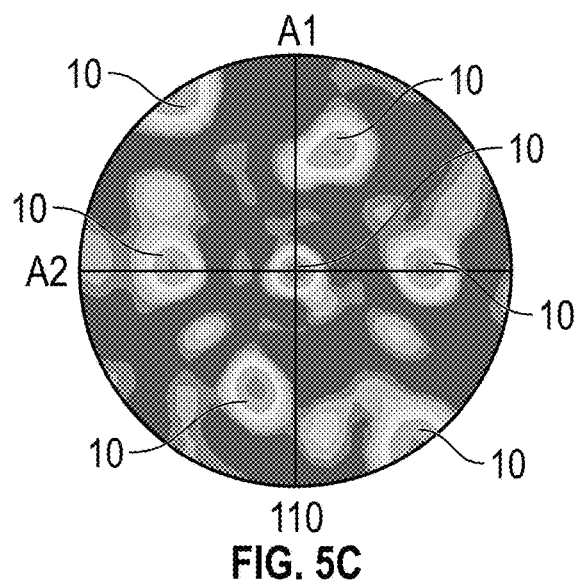
Figure 7:
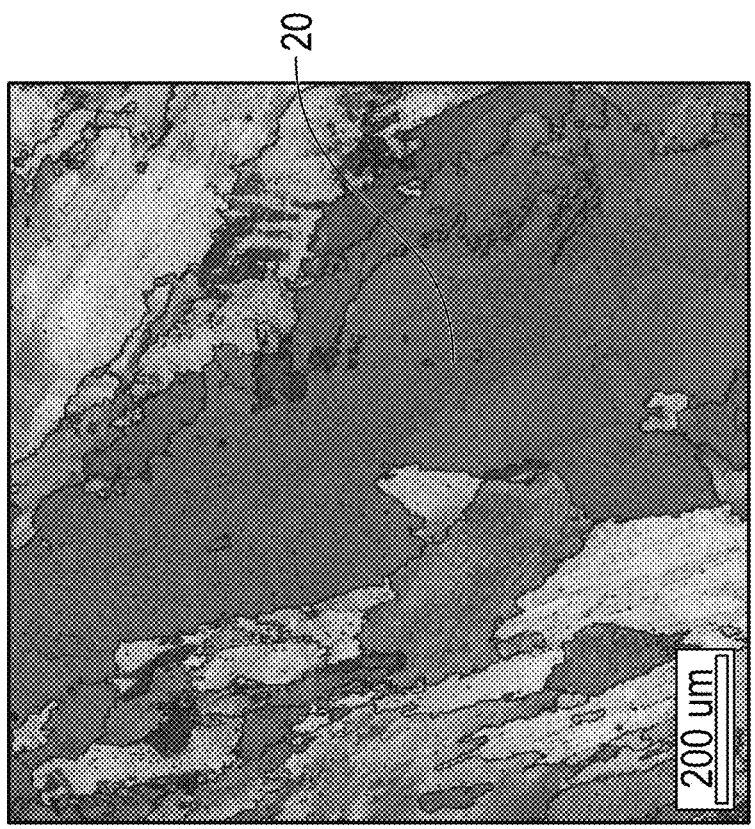
FIG. 7 is a Taylor Factor map.
Figure 6:
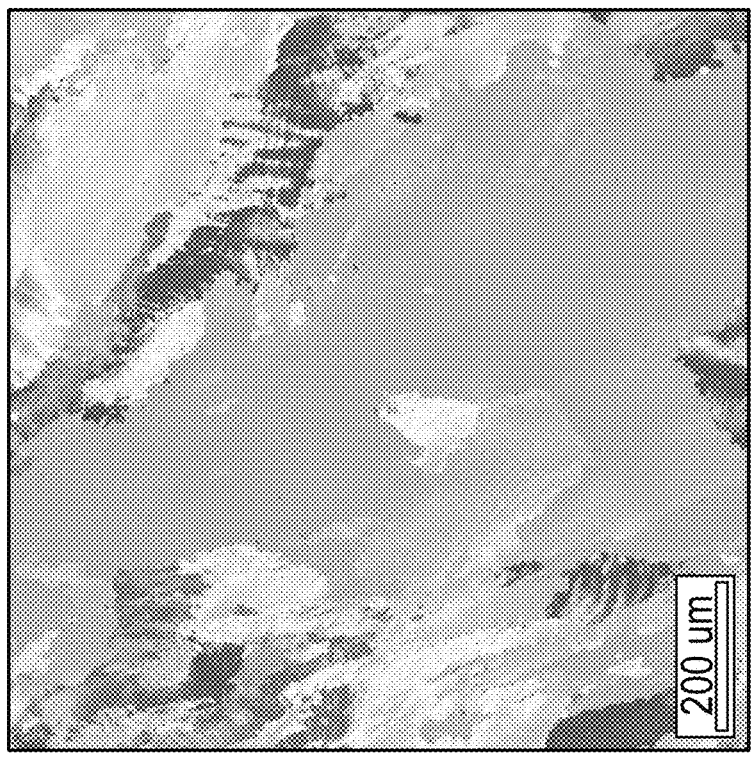

FIGS. 5A-C are similar to FIGS. 2A-C except the sample is taken from the gage section of the sample. FIGS. 5A-C shown more similarly oriented grains (10) and a more ordered microstructure than found in the grip section shown in FIGS. 2A-C. FIG. 6 is similar to FIG. 3 but shows an increased grain size in the gage section compared to the grip section. FIG. 7 is a Taylor Factor map of the gage section sample and shows more area having a high Taylor Factor (20) than seen in FIG. 4 for the grip section.

Various methods of metal additive manufacturing and cold working may be used to generate a library correlating grain size, grain direction and mechanical properties. Modeling of the combined processes may be used to guide development of this library. Process parameters to produce the desired grain size as well as the direction and normal load to induce the compressive strain are part of the modeling process and creation of the library. The creation of the library will provide a resource for fabrication of articles with customized properties.

The combination of metal additive manufacturing and cold working can be used to fabricate new articles, repair existing damaged articles and repurpose existing articles. Damaged sections of existing articles can be replaced with or repaired by the method described herein. Existing articles can be modified to meet new design requirements (repurposed) by the methods described herein.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for making a metal article comprising:
   repetitively depositing a layer of metal by additive manufacturing and cold working each metal layer to form the metal article;
   wherein the cold working comprises directionally cold working each metal layer;
   wherein the additive manufacturing parameters are manipulated to control local average grain size and the cold working parameters are manipulated to control local grain crystallographic orientation to provide a customized local average grain size and a customized local non-random grain crystallographic orientation of the metal article; and
   wherein the local non-random grain crystallographic orientation varies by region within the metal article based on design requirements;
   wherein the metal article has a first physical property in a first region and a second physical property in a second region;
   wherein the first region has a first physical property value of the first physical property and the second region has a second physical property value of the second physical property, the first physical property value different than the second physical property value; and
   wherein the first and second regions each comprise multiple layers of deposited metal.

2. The method of claim 1, wherein additive manufacturing method comprises a melt pool or melted metal layer.

3. The method of claim 1, wherein additive manufacturing comprises directed energy deposition.

4. The method of claim 1, wherein the metal layer comprises nickel, cobalt, copper, titanium, aluminum, iron, alloys including one or more of the foregoing metals, and combinations thereof.

5. The method of claim 1, wherein the cold working directionally applies energy in the form of compressive strain.

6. The method of claim 1, wherein cold working comprises deep rolling, deep rolling with an ultrasonic head, and high frequency electromagnetic hammer, pneumatic roller vibrator, and combinations thereof.

7. The method of claim 1, wherein the first and second physical property is yield stress, tensile strength or tensile modulus.

8. A method for repairing a metal article comprising:
   repetitively depositing a layer of metal by additive manufacturing and cold working each deposited layer,
   wherein the depositing and cold working occurs over a damaged section of the metal article to form a repaired section; and
   wherein the cold working comprises directionally cold working each deposited layer;
   wherein the additive manufacturing parameters are manipulated to control local average grain size and the cold working parameters are manipulated to control local grain crystallographic orientation to provide a customized local average grain size and a customized local non-random grain crystallographic orientation of the metal article; and
   wherein the local non-random grain crystallographic orientation varies by region within the metal article based on design requirements;
   wherein the metal article has a first physical property in a first region and a second physical property in a second region;
   wherein the first region has a first physical property value of the first physical property and the second region has a second physical property value of the second physical property, the first physical property value different than the second physical property value; and
   wherein the first and second regions each comprise multiple layers of deposited metal.

9. The method of claim 8, wherein additive manufacturing method comprises a melt pool or melted metal layer.

10. The method of claim 8, wherein additive manufacturing comprises directed energy deposition.

11. The method of claim 8, wherein the metal layer comprises nickel, cobalt, copper, titanium, aluminum, iron, alloys including one or more of the foregoing metals, and combinations thereof.

12. The method of claim 8, wherein the cold working directionally applies energy in the form of compressive strain.

13. The method of claim 8, wherein cold working comprises deep rolling, deep rolling with an ultrasonic head, and high frequency electromagnetic hammer, pneumatic roller vibrator, and combinations thereof.

14. The method of claim 8, wherein the first and second physical property is yield stress, tensile strength or tensile modulus.

15. A metal article comprising:
    a customized local average grain size, and having a customized local non-random grain crystallographic orientation;

wherein the local non-random grain crystallographic orientation varies by region within the article based on design requirements;

wherein the metal article has a first physical property in a first region and a second physical property in a second region;

wherein the first region has a first physical property value of the first physical property and the second region has a second physical property value of the second physical property, the first physical property value different than the second physical property value; and wherein the first and second regions each comprise multiple layers of deposited cold worked metal.

16. The metal article of claim 15, wherein the article comprises nickel, cobalt, copper, titanium, aluminum, iron, alloys including one or more of the foregoing metals, and combinations thereof.

17. The metal article of claim 15, wherein the first and second physical property is yield stress, tensile strength or tensile modulus.

* * * * *